United States Patent
Han

(10) Patent No.: US 9,092,876 B2
(45) Date of Patent: Jul. 28, 2015

(54) OBJECT-TRACKING APPARATUS AND METHOD IN ENVIRONMENT OF MULTIPLE NON-OVERLAPPING CAMERAS

(75) Inventor: Min-Ho Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 450 days.

(21) Appl. No.: 13/592,272

(22) Filed: Aug. 22, 2012

(65) Prior Publication Data

US 2013/0051619 A1    Feb. 28, 2013

(30) Foreign Application Priority Data

Aug. 25, 2011 (KR) .................. 10-2011-0085276
Apr. 12, 2012 (KR) .................. 10-2012-0038085

(51) Int. Cl.
*G06K 9/00* (2006.01)
*G06T 7/20* (2006.01)
*G06K 9/46* (2006.01)

(52) U.S. Cl.
CPC ............ *G06T 7/2033* (2013.01); *G06K 9/4647* (2013.01); *G06K 9/4652* (2013.01); *G06T 2207/10016* (2013.01); *G06T 2207/10024* (2013.01)

(58) Field of Classification Search
CPC ...... G06T 5/40; G06K 9/4652; G06K 9/4642; G06K 9/4647; G06K 9/6212
See application file for complete search history.

(56) References Cited

U.S. PATENT DOCUMENTS

2002/0176001 A1* 11/2002 Trajkovic ...................... 348/169
2006/0177097 A1*  8/2006 Fujimura et al. .............. 382/103

OTHER PUBLICATIONS

Park et al., "A Contrast Enhancement Method using Dynamic Range Separate Histogram Equalization", Nov. 2008, IEEE Trans. on Consumer Electronics, vol. 54, iss. 4, p. 1981-1987.*
Piccardi et al., "Multi-frame Moving Object Track Matching Based on an Incremental Major Color Spectrum Histogram Matching Algorithm", Jun. 25, 2005, IEEE Computer Society Conf. on COmputer Vision and Pattern Recognition—Workshops, 2005, 19 pages.*
Bryan Prosser et al., "Multi-camera Matching using Bi-Directional Cumulative Brightness Transfer Functions", British Machine Vision Conference (BMVC), 2008.

* cited by examiner

*Primary Examiner* — Stephen R Koziol
*Assistant Examiner* — Timothy Choi

(57) ABSTRACT

Disclosed herein is an object-tracking apparatus and method in the environment of multiple non-overlapping cameras. Color rendering values are divided into a plurality of sub-color regions. RGB pixels of objects in a first image and a second image are converted into first hue values and second hue values, respectively. The first hue values are assigned to corresponding sub-color regions, and then a first color histogram is generated. The second hue values are assigned to corresponding sub-color regions, and then a second color histogram is generated. An area of the first color histogram is extended. It is determined whether the second color histogram is included in the extended area of the first color histogram. It is determined that the object in the first image is identical to the object in the second image if the second color histogram is included in the extended area of the first color histogram.

10 Claims, 7 Drawing Sheets

US 9,092,876 B2

OBJECT-TRACKING APPARATUS AND METHOD IN ENVIRONMENT OF MULTIPLE NON-OVERLAPPING CAMERAS

CROSS REFERENCE TO RELATED APPLICATIONS

This application claims the benefit of Korean Patent Application Nos. 10-2011-0085276, filed on Aug. 25, 2011 and 10-2012-0038085, filed on Apr. 12, 2012, which are hereby incorporated by reference in their entirety into this application.

BACKGROUND OF THE INVENTION

1. Technical Field

The present invention relates generally to an object-tracking apparatus and method in the environment of multiple non-overlapping cameras. More particularly, the present invention relates to an object-tracking apparatus and method, which are capable of tracking an identical object using color modeling without requiring a training phase in the environment of multiple non-overlapping cameras.

2. Description of the Related Art

Objects present in an image collected by a camera can be represented by three (Red, Green, Blue: RGB) color channels. Further, research into intentions to track an identical object in the environment of multiple non-overlapping cameras using a color histogram consisting of RGB color channels has been conducted.

In more detail, if it is assumed that images respectively captured by cameras $C_i$ and $C_j$ for an identical object are $V_i$ and $V_j$, a model function, a mean Bright Transfer Function (BTF), a cumulative BTF, etc. have been presented as methods of establishing the following Equation (1):

$$\text{Color histogram of } V_i = \text{Color histogram of } V_j \text{(that is, } V_i = f(V_j)\text{)} \tag{1}$$

However, the conventional technology that has been presented requires a training phase before the application thereof. That is, in order to define a function f, a preliminary arrangement task (for example: calibration) using training data is required. Further, assuming that $V_1 = f_a(V_2)$ and $V_2 = f_b(V_3)$ are satisfied, and $V_1 = f_a(f_b(V_3))$ is established, in the case where n cameras for collecting images are present, n−1 functions f are required. Further, when surrounding optical characteristics (light, illumination, etc.) change after cameras have been installed, a retraining phase for recalculating and re-generating functions f is required.

Further, when significant changes in the surrounding optical characteristics (light, illumination, etc.) of installed cameras frequently occur, differences between optical characteristics in camera views are significant, so that differences between color histograms for an identical object according to the location increase, thus causing the problem of making it impossible to use the conventional technology.

That is, even color histograms for an identical object may be displayed differently depending on changes in an external environment, in particular, light, illumination, etc. Examples of this case may include cases where cameras are installed in places having different indoor illumination brightness, where cameras are installed in an outdoor area in which changes in light are significant, where an object located in a bright place moves to a shadow area, and other cases.

Therefore, at the present time, there is required the development of object-tracking technology in the environment of multiple non-overlapping cameras, which can solve the above problems and does not require a training phase.

SUMMARY OF THE INVENTION

Accordingly, the present invention has been made keeping in mind the above problems occurring in the prior art, and an object of the present invention is to provide object-tracking technology which can track an identical object using color modeling without requiring a training phase in the environment of multiple non-overlapping cameras.

Another object of the present invention is to provide object-tracking technology, which can continuously track an identical object even if the color histogram of the identical object changes when the optical characteristics of a place at which cameras are installed change.

A further object of the present invention is to provide object-tracking technology, which does not require a preliminary arrangement task because a training phase is not necessary and which can efficiently perform installation and operation.

Yet another object of the present invention is to provide object-tracking technology, which can be applied even to cases where there are large differences between optical characteristics in camera views and then the color histograms of an identical object are greatly different from each other according to location.

Still another object of the present invention is to provide object-tracking technology, which is implemented using a relatively simple algorithm and is then capable of being applied even to a camera that is an embedded system.

In accordance with an aspect of the present invention to accomplish the above objects, there is provided an object-tracking method in an environment of multiple non-overlapping cameras, including dividing color rendering values required to represent colors into a plurality of sub-color regions; converting Red, Green, Blue (RGB) pixels of objects present in a first image and a second image acquired by cameras into first hue values and second hue values, respectively; assigning the first hue values to corresponding sub-color regions, and then generating a first color histogram; assigning the second hue values to corresponding sub-color regions, and then generating a second color histogram; extending an area of the first color histogram to a predetermined width; determining whether the second color histogram is included in the extended area of the first color histogram; and determining that the object in the first image is identical to the object in the second image if the second color histogram is included in the extended area of the first color histogram.

Preferably, the generating the first color histogram is configured to extract a first sub-color region set having hue values equal to or greater than a first predetermined value, among the first hue values assigned to the sub-color regions, and generate the first color histogram for the first sub-color region set, and the generating the second color histogram may be configured to extract a second sub-color region set having hue values equal to or greater than a second predetermined value, among the second hue values assigned to the sub-color regions, and generate the second color histogram for the second sub-color region set.

Preferably, the first predetermined value may be an average value of the first hue values and the second predetermined value may be an average value of the second hue values.

Preferably, the generating the first color histogram may be configured to group successively appearing sub-color regions among the sub-color regions to which the first hue values have been assigned, and approximate the grouped sub-color regions based on a center value of the grouped sub-color regions, thus generating the first color histogram, and the generating the second color histogram may be configured to group successively appearing sub-color regions among the sub-color regions to which the second hue values have been assigned, and approximate the grouped sub-color regions based on a center value of the grouped sub-color regions, thus generating the second color histogram.

Preferably, the dividing into the plurality of sub-color regions may be configured to continuously divide the color rendering values at regular intervals and then form the plurality of sub-color regions.

Preferably, the object-tracking method may further include determining that the object in the first image is different from the object in the second image when differences in saturation and intensity between the first image and the second image are greater than a predetermined value or more and when both saturation and intensity of the second image are increased or decreased compared to the first image, even if the second color histogram is included in the extended area of the first color histogram.

Preferably, the object-tracking method may further include determining that the object in the first image is different from the object in the second image when one of the object of the first image and the object of the second image has intensity less than a predetermined lower limit and a remaining object has intensity equal to or greater than a predetermined upper limit, even if the second color histogram is included in the extended area of the first color histogram.

In accordance with another aspect of the present invention to accomplish the above objects, there is provided an object-tracking apparatus in an environment of multiple non-overlapping cameras, including a sub-color region definition unit for dividing color rendering values required to represent colors into a plurality of sub-color regions; a hue value conversion unit for converting Red, Green, Blue (RGB) pixels of objects present in a first image and a second image acquired by a camera into first hue values and second hue values, respectively; an assignment unit for assigning the first hue values and the second hue values to corresponding sub-color regions, respectively; a color histogram generation unit for generating a first color histogram for the first hue values and a second color histogram for the second hue values using the first hue values and the second hue values assigned to the sub-color regions; a color histogram extension unit for extending an area of the first color histogram to a predetermined width; and a color histogram comparison unit for determining that the object in the first image is identical to the object in the second image if the second color histogram is included in the extended area of the first color histogram.

Preferably, the object-tracking apparatus may further include an extraction unit for extracting a first sub-color region set having hue values equal to or greater than a first predetermined value, among the first hue values assigned to the sub-color regions, and extracting a second sub-color region set having hue values equal to or greater than a second predetermined value, among the second hue values assigned to the sub-color regions, wherein the color histogram generation unit generates the first color histogram for the first sub-color region set and generates the second color histogram for the second sub-color region set.

Preferably, the first predetermined value may be an average value of the first hue values and the second predetermined value may be an average value of the second hue values.

Preferably, the object-tracking apparatus may further include an approximation unit for grouping successively appearing sub-color regions among the sub-color regions to which the first hue values have been assigned and approximating the grouped sub-color regions based on a center value of the grouped sub-color regions, and for grouping successively appearing sub-color regions among the sub-color regions to which the second hue values have been assigned and approximating the grouped sub-color regions based on a center value of the grouped sub-color regions, wherein the color histogram generation unit generates the color histograms using the sub-color regions respectively approximated for the first hue values and for the second hue values.

Preferably, the sub-color region definition unit may continuously divide the color rendering values at regular intervals and then forms the plurality of sub-color regions.

Preferably, the object-tracking apparatus may further include an intensity and saturation condition comparison unit for determining that the object in the first image is different from the object in the second image when differences in saturation and intensity between the first image and the second image are greater than a predetermined value or more and when both saturation and intensity of the second image are increased or decreased compared to the first image, even if it is determined by the color histogram comparison unit that the second color histogram is included in the extended area of the first color histogram.

Preferably, the object-tracking apparatus may further include an intensity and saturation condition comparison unit for determining that the object in the first image is different from the object in the second image when one of the object of the first image and the object of the second image has intensity less than a predetermined lower limit and a remaining object has intensity equal to or greater than a predetermined upper limit, even if it is determined by the color histogram comparison unit that the second color histogram is included in the extended area of the first color histogram.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
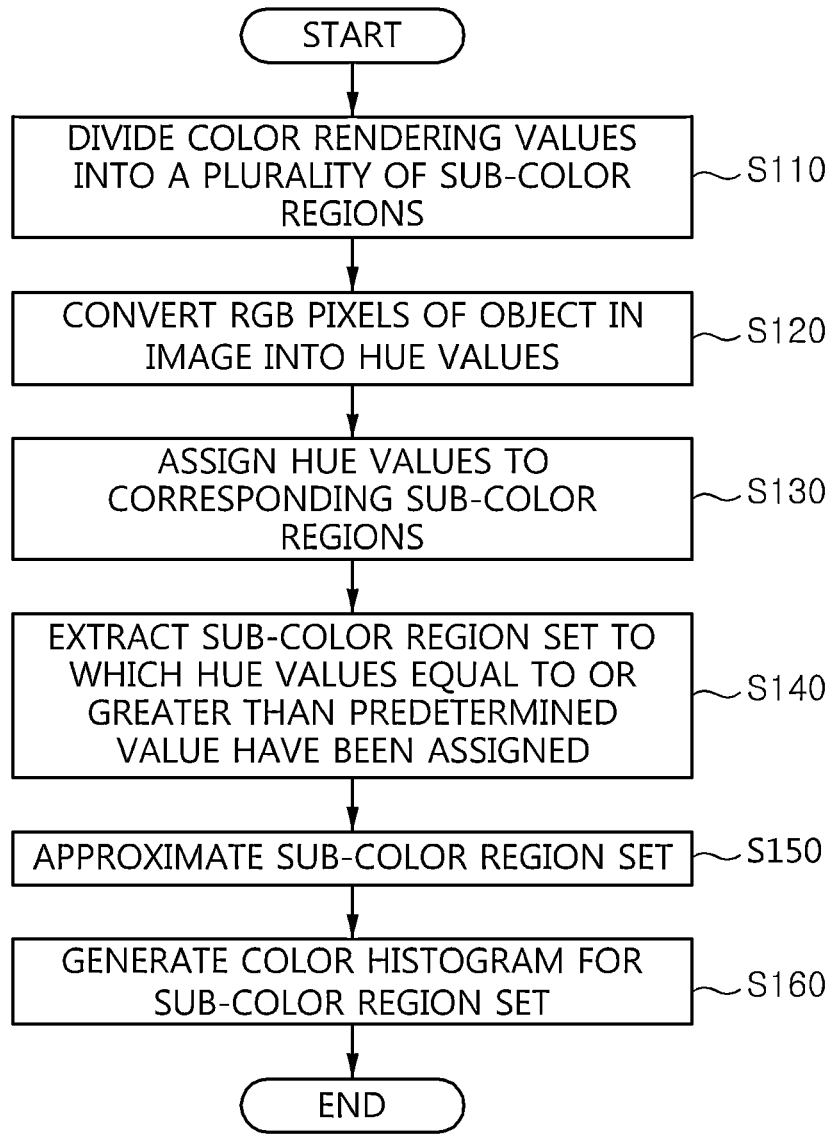
FIG. 1 is a flowchart showing the color histogram generation method of an object-tracking method in the environment of multiple non-overlapping cameras according to the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, a method of generating a color histogram for an object in an image in an object-tracking method in the environment of multiple non-overlapping cameras according to the present invention will be described.

Figure 2:
FIG. 2 is a diagram showing color rendering values.
Figure 3:
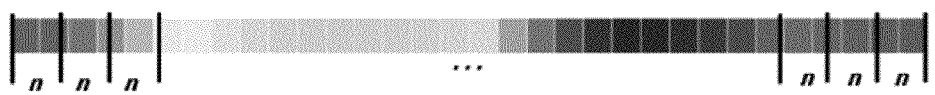
FIG. 3 is a diagram showing the procedure of dividing the color rendering values of FIG. 2 into a plurality of sub-color regions.
Figure 4:
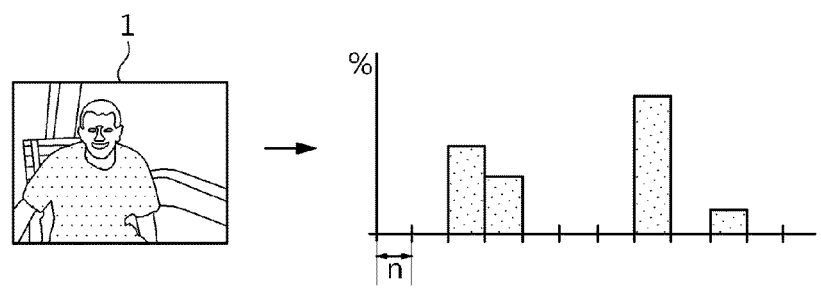
FIGS. 4 to 6 are reference diagrams illustrating the method of generating a color histogram.
Figure 5:
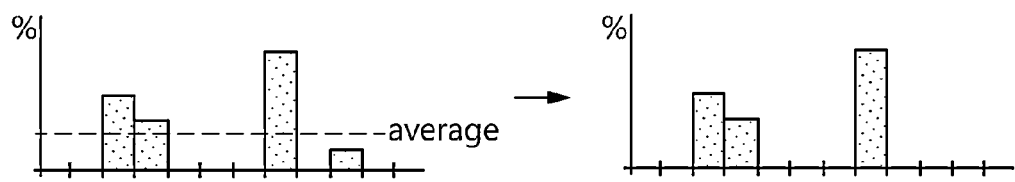
Figure 6:
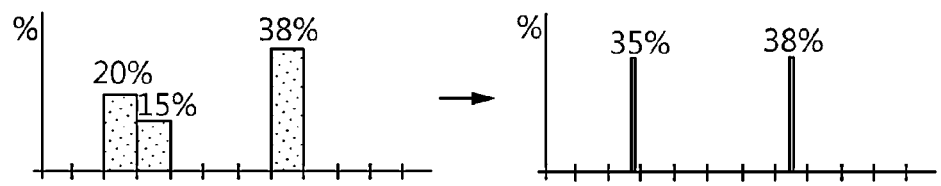

FIG. 1 is a flowchart showing the color histogram generation method of an object-tracking method in the environment of multiple non-overlapping cameras according to the present invention. FIG. 2 is a diagram showing color rendering values. FIG. 3 is a diagram showing the procedure of dividing the color rendering values of FIG. 2 into a plurality of sub-color regions. FIGS. 4 to 6 are reference diagrams illustrating the method of generating a color histogram.

Referring to FIG. 1, in the object-tracking method in the environment of multiple non-overlapping cameras according to the present invention, the method of generating a color histogram for an object in an image is configured to primarily divide color rendering values required to represent colors into a plurality of sub-color regions at step S110. In this case, the color rendering values may be displayed in the shape of a bar graph shown in FIG. 2 and may be represented by values ranging from 0 to 360 degrees. Further, referring to FIG. 1 together with FIG. 3, at step S110, the bar graph for representing color rendering values is divided into a plurality of sub-color regions 'a.' Here, the sub-color regions 'a' may be continuously divided at regular intervals of n.

Furthermore, RGB pixels of an object in the image acquired by each camera are converted into hue values at step S120. Here, the hue values of the object can be converted for RGB color channels, as given by the following Equation (2):

$$H = \cos^{-1}\left[\frac{\frac{1}{2}[(R-G)+(R-B)]}{\sqrt{(R-G)^2+(R-B)(G-B)}}\right] \quad (2)$$

Further, the hue values obtained at step S120 are assigned to the corresponding sub-color regions from among the plurality of sub-color regions, respectively defined at step S110, at step S130. Referring to FIG. 1 together with FIG. 4, at step S130, hue values for a predetermined object in an image 1 are calculated and are then respectively assigned to the plurality of sub-color regions, so that the hue values are represented by a bar graph. In the graph of FIG. 4, a horizontal axis in the graph denotes the plurality of sub-color regions formed at regular intervals of n from division, and a vertical axis denotes the percentage of relevant sub-color regions occupied in all colors of the object.

Further, a sub-color region set having hue values equal to or greater than a predetermined value among the hue values assigned to the sub-color regions is extracted at step S140. The predetermined value at step S140 may be an average value of the corresponding hue values. The left graph of FIG. 5 is a bar graph in which the hue values of the object extracted at step S130 are assigned to the corresponding sub-color regions. Further, the right graph of FIG. 5 is a bar graph in which only a set of bars, that is, the sub-color region set, having hue values equal to or greater than the predetermined value is extracted at step S140 and is then shown. The predetermined value at this time may be an average value of the hue values of the object.

In the sub-color region set extracted at step S140, successively appearing sub-color regions are grouped, and the grouped sub-color regions are approximated based on the center value of the grouped sub-color regions at step S150, so that the color histogram for the sub-color region set is generated at step S160. Referring to FIG. 6, it can be seen that the sub-color regions grouped at step S150 are approximated based on the center value, and the approximated color histogram is generated.

Hereinafter, a method of determining whether objects in images are identical to each other in the object-tracking method in the environment of multiple non-overlapping cameras according to the present invention will be described.

Figure 7:
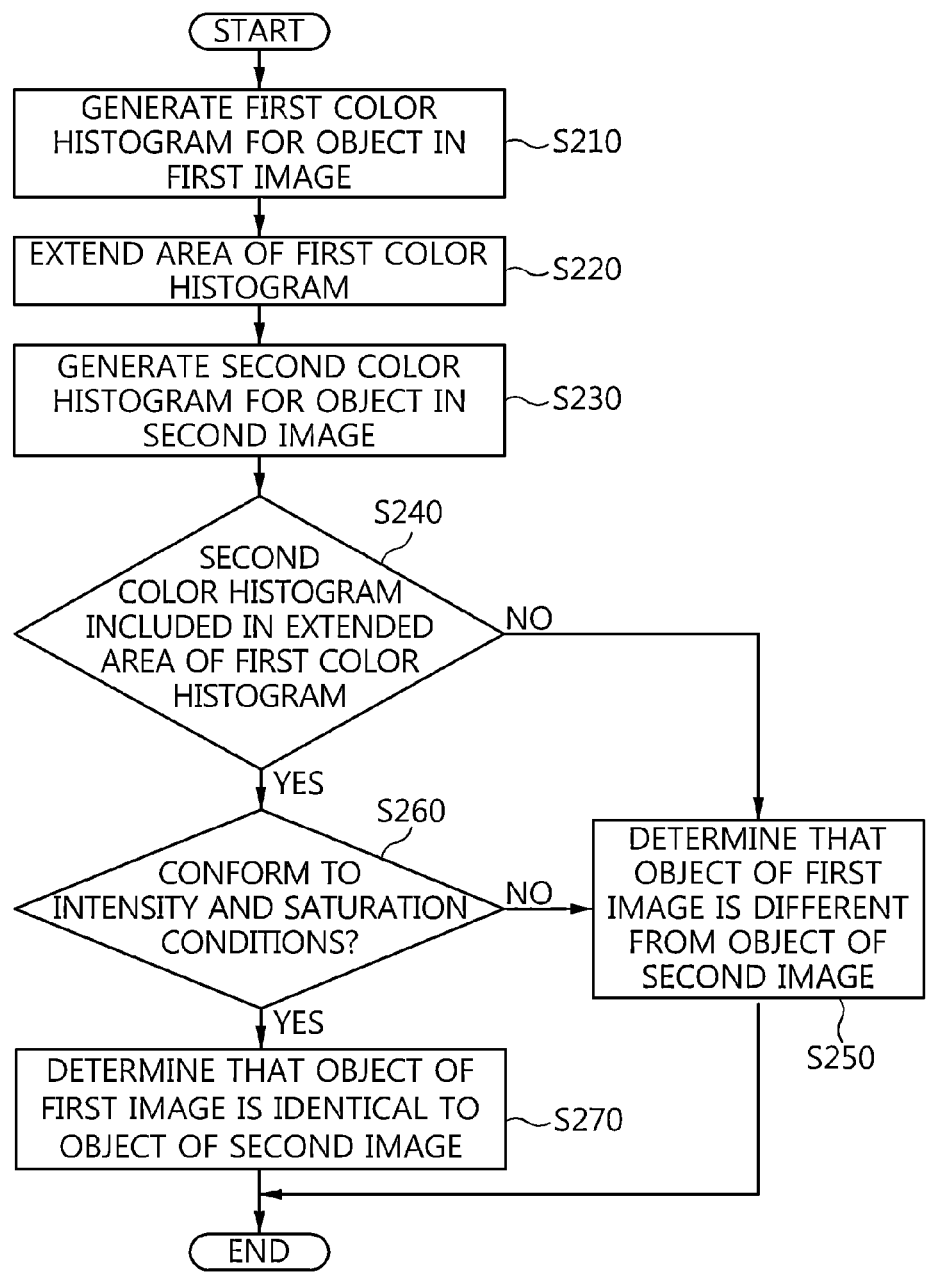
FIG. 7 is a flowchart showing a method of determining whether an object in a first image is identical to an object in a second image in the object-tracking method in the environment of multiple non-overlapping cameras according to the present invention.

FIG. 7 is a reference diagram showing a method of determining whether an object in a first image is identical to an object in a second image, in the object-tracking method in the environment of multiple non-overlapping cameras according to the present invention. FIGS. 8 to 11 are reference diagrams illustrating the method of determining whether an object in a first image is identical to an object in a second image.

Figure 8:
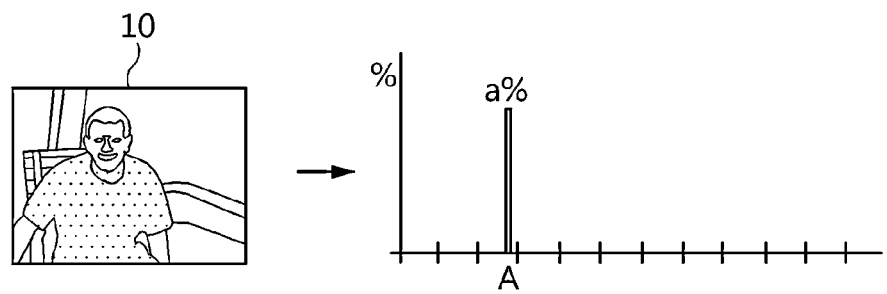
FIGS. 8 to 11 are reference diagrams illustrating the method of determining whether an object in a first image is identical to an object in a second image.

Referring to FIG. 7, in the method of determining whether objects in a plurality of images are identical to each other, in the object-tracking method in the environment of multiple non-overlapping cameras according to the present invention, a first color histogram for an object in a first image is generated at step S210. In this case, the method of generating the first color histogram is implemented using the color histogram generation method that has been described with reference to FIGS. 1 to 6. In FIG. 8, the graph of a first color histogram for a first image 10 is shown.

Figure 9:
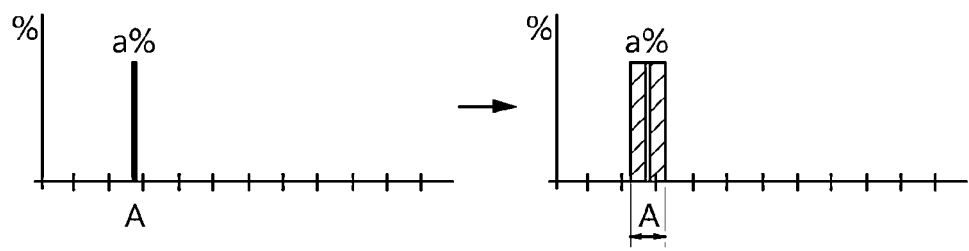

Thereafter, the area of the first color histogram generated at step S210 is extended to a predetermined width, as shown in FIG. 9, at step S220.

Figure 10:
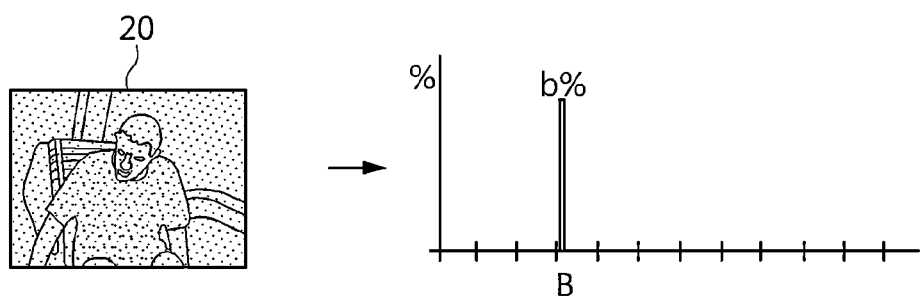
Figure 11:
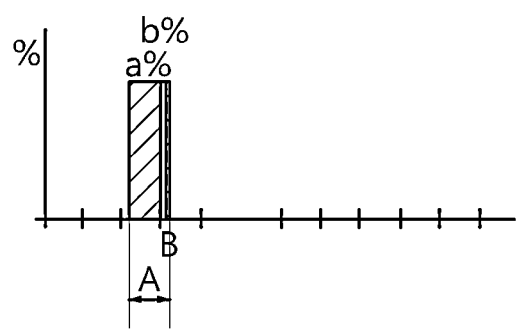

Further, a second color histogram for an object in a second image is generated at step S230. In this case, the method of generating the second color histogram is implemented using the color histogram generation method that has been described with reference to FIGS. 1 to 6. In FIG. 10, a graph of a second color histogram for a second image 20 is shown. Here, the second image 20 is an image captured at a different time from when the first image 10 was captured and at the same location where the first image 10 was captured, and it is assumed that a deeper shadow hangs over a given background.

At step S240, it is determined whether the second color histogram generated at step S230 is included in the extended area of the first color histogram obtained at step S220.

If it is determined at step S240 that the second color histogram is not included in the extended area of the first color histogram, it is determined that the object of the first image is different from the object of the second image at step S250.

In contrast, if it is determined at step S240 that the second color histogram is included in the extended area of the first color histogram, it is determined whether the brightness (intensity) and saturation of the first image and the second image conform to preset conditions at step S260. For reference, in FIG. 11, an example in which the second color histogram is included in the extended area of the first color histogram is shown. In this case, the preset conditions may be given as follows. First, the case where differences in saturation and intensity between the first image and the second image are greater than a predetermined value or more, and where both the saturation and intensity of the second image increase or decrease compared to the first image may be determined to be the case that does not conform to the conditions. This case refers to the condition that incorporates characteristics that when the identical object moves to a relatively dark place, intensity decreases and saturation increases, and that when, on the contrary, the identical object moves to a relatively bright place, intensity increases and saturation decreases. Second, the case where one of the object in the first image and the object in the second image has intensity less than a predetermined lower limit and the other object has intensity equal to or greater than a predetermined upper limit may be determined to the case that does not conform to the conditions. This case refers to the condition that incorporates characteristics that when the intensity of an object is excessively low, a dark color is realized, so that saturation becomes meaningless.

At step S260, values of intensity I and saturation S can also be derived by the following Equations (3) and (4):

$$I = \frac{1}{3}(R+G+B) \quad (3)$$

$$S = 1 - \frac{3}{R+G+B}[\min(R, G, B)] \quad (4)$$

If it is determined at step S260 that the first image and the second image do not conform to the preset conditions of intensity and saturation, it is determined that the object of the first image is different from that of the second image at step S250.

In contrast, if it is determined at step S260 that the first image and the second image conform to the preset conditions of intensity and saturation, it is finally determined that the object of the first image is identical to the object of the second image at step S270.

Hereinafter, the configuration and operation of an object-tracking apparatus in the environment of multiple non-overlapping cameras according to the present invention will be described.

Figure 12:
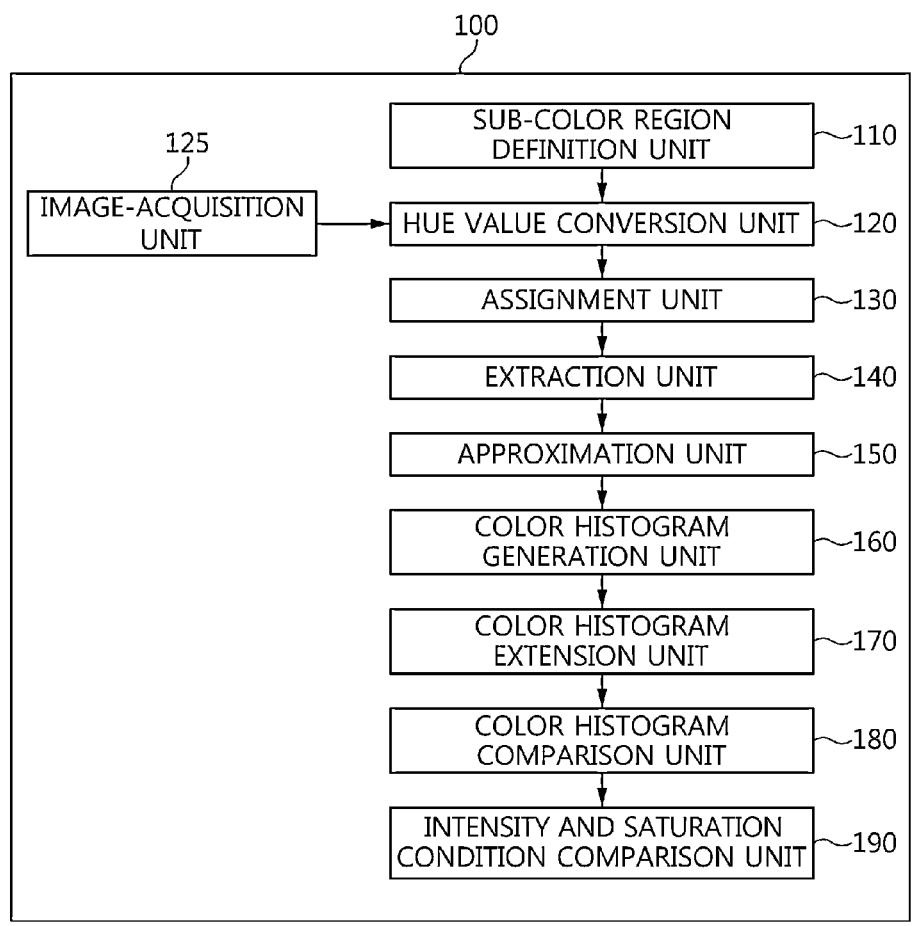
FIG. 12 is a block diagram showing the configuration of an object-tracking apparatus in the environment of multiple non-overlapping cameras according to the present invention.

FIG. 12 is a block diagram showing the configuration of an object-tracking apparatus in the environment of multiple non-overlapping cameras according to the present invention.

Referring to FIG. 12, an object-tracking apparatus 100 in the environment of multiple non-overlapping cameras according to the present invention includes a sub-color region definition unit 110, a hue value conversion unit 120, an assignment unit 130, a color histogram generation unit 160, a color histogram extension unit 170, and a color histogram comparison unit 180. The object-tracking apparatus 100 in the environment of multiple non-overlapping cameras the present invention may further include an extraction unit 140, an approximation unit 150, and an intensity and saturation condition comparison unit 190.

The sub-color region definition unit 110 divides color rendering values required to represent colors into a plurality of sub-color regions.

The hue value conversion unit 120 converts RGB pixels of objects present in a first image and a second image acquired by an image acquisition unit 125 into first hue values and second hue values, respectively. In this case, the image acquisition unit 125 may be a camera.

The assignment unit 130 assigns the first hue values and the second hue values obtained by the hue value conversion unit 120 to corresponding sub-color regions defined by the sub-color region definition unit 110.

The extraction unit 140 extracts hue values equal to or greater than a first predetermined value among the first hue values as a first sub-color region set. Further, the extraction unit 140 extracts hue values equal to or greater than a second predetermined value among the second hue values as a second sub-color region set. Here, the first predetermined value may be an average value of the first hue values and the second predetermined value may be an average value of the second hue values.

The approximation unit 150 groups successively appearing color regions among the sub-color regions to which the first hue values have been assigned, and approximates the grouped sub-color regions based on the center value of the grouped sub-color regions. Further, the approximation unit 150 groups successively appearing color regions among the sub-color regions to which the second hue values have been assigned, and approximates the grouped sub-color regions based on the center value of the grouped sub-color regions.

The color histogram generation unit 160 generates a first color histogram for the first hue values and a second color histogram for the second hue values using the first hue values and the second hue values assigned to the sub-color regions. The color histogram generation unit 160 may generate the first color histogram and the second color histogram by using the color histogram generation method that has been described with reference to FIGS. 1 to 6.

The histogram extension unit 170 extends the area of the first color histogram to a predetermined width.

The color histogram comparison unit 180 performs comparison to determine whether the second color histogram generated by the color histogram generation unit 160 is included in the area of the first color histogram extended by the color histogram extension unit 170. Further, if it is determined that the second color histogram is not included in the extended area of the first color histogram, the color histogram comparison unit 180 determines that the object in the first image is different from the object in the second image. In contrast, if it is determined that the second color histogram is included in the extended area of the first color histogram, the color histogram comparison unit 180 may determine that the object in the first image is identical to the object in the second image.

Even if it is determined by the color histogram comparison unit 180 that the second color histogram is included in the extended area of the first color histogram, the intensity and saturation condition comparison unit 190 additionally determines whether the intensity and saturation of the first image and the second image conform to preset conditions, and finally determines whether the object in the first image is identical to the object in the second image. In this case, the preset conditions determined by the intensity and saturation condition comparison unit 190 may be given as follows. First, the case where differences in saturation and intensity between the first image and the second image are greater than a predetermined value or more, and where both the saturation and intensity of the second image increase or decrease compared to the first image may be determined to be the case that does not conform to the conditions. Second, the case where one of the object in the first image and the object in the second image has intensity less than a predetermined lower limit and the other object has intensity equal to or greater than a predetermined upper limit may be determined to the case that does not conform to the conditions. If the intensity and saturation conditions of the first image and the second image conform to the preset conditions, the intensity and saturation condition comparison unit 190 determines that the object in the first image is identical to the object in the second image. In contrast, if the intensity and saturation conditions of the first image and the second image do not conform to the preset conditions, the intensity and saturation condition comparison unit 190 determines that the object in the first image is different from the object in the second image.

As described above, the object-tracking apparatus and method in the environment of multiple non-overlapping cameras according to the present invention are not limited to the configurations and schemes of the above-described embodiments, and some or all of those embodiments may be selectively combined and configured so that various modifications and changes are possible.

In accordance with the present invention, there can be provided object-tracking technology, which can track an identical object using color modeling without requiring a training phase in the environment of multiple non-overlapping cameras.

Further, the present invention provides object-tracking technology, which can continuously track an identical object even if the color histogram of the identical object changes when the optical characteristics of a place at which cameras are installed change.

Furthermore, the present invention does not require a preliminary arrangement task because a training phase is not necessary and can efficiently perform installation and operation.

Furthermore, the present invention provides object-tracking technology, which can be applied even to cases where there are large differences between optical characteristics in camera views and then the color histograms of an identical object are greatly different from each other according to location.

Furthermore, the present invention provides object-tracking technology, which is implemented using a relatively simple algorithm and is then capable of being applied even to a camera that is an embedded system.

What is claimed is:

1. An object-tracking method in an environment of multiple non-overlapping cameras, comprising:
    dividing color rendering values required to represent colors into a plurality of sub-color regions;
    converting Red, Green, Blue (RGB) pixels of objects present in a first image and a second image acquired by cameras into first hue values and second hue values, respectively;
    assigning the first hue values to first sub-color regions, and then generating a first color histogram for a first sub-color region set by extracting the first sub-color region set among the first hue values assigned to the sub-color regions, the first sub-color region set having hue values equal to or greater than a first predetermined value;
    assigning the second hue values to second sub-color regions, and then generating a second color histogram for a second sub-color region set by extracting the second sub-color region set among the second hue values assigned to the sub-color regions, the second sub-color region set having hue values equal to or greater than a second predetermined value;
    extending an area of the first color histogram to a predetermined width;
    determining whether the second color histogram is included in the extended area of the first color histogram; and
    determining that the object in the first image is identical to the object in the second image if the second color histogram is included in the extended area of the first color histogram, wherein the first predetermined value is an average value of the first hue values and the second predetermined value is an average value of the second hue values.

2. The object-tracking method of claim 1, wherein:
    the first color histogram is generated by grouping successively appearing sub-color regions among the first sub-color regions, and approximating the grouped first sub-color regions based on a center value of the grouped first sub-color regions, and
    the second color histogram is generated by grouping successively appearing sub-color regions among the second sub-color regions, and approximating the grouped second sub-color regions based on a center value of the grouped second sub-color regions, thus generating the second color histogram.

3. The object-tracking method of claim 1, wherein the color rendering values are divided continuously and at regular intervals into the plurality of sub-color regions.

4. The object-tracking method of claim 1, further comprising:
    determining that the object in the first image is different from the object in the second image when differences in saturation and intensity between the first image and the second image are greater than a third predetermined value or more and when both saturation and intensity of the second image are increased or decreased compared to the first image, even if the second color histogram is included in the extended area of the first color histogram.

5. The object-tracking method of claim 1, further comprising:
    determining that the object in the first image is different from the object in the second image when one of the object of the first image and the object of the second image has an intensity less than a predetermined lower limit and a remaining object has an intensity equal to or greater than a predetermined upper limit, even if the second color histogram is included in the extended area of the first color histogram.

6. An object-tracking apparatus in an environment of multiple non-overlapping cameras, comprising:
    a sub-color region definer that defines color rendering values required to represent colors into a plurality of sub-color regions;
    a hue value converter that converts Red, Green, Blue (RGB) pixels of objects present in a first image and a second image acquired by a camera into first hue values and second hue values, respectively;
    an assignor that assigns the first hue values and the second hue values to corresponding sub-color regions, respectively;
    a color histogram generator that generates a first color histogram for the first hue values and a second color histogram for the second hue values using the first hue values and the second hue values assigned to the sub-color regions;
    a color histogram extender that extends an area of the first color histogram to a predetermined width;
    a color histogram comparator that determines that the object in the first image is identical to the object in the second image if the second color histogram is included in the extended area of the first color histogram; and
    an extractor that extracts a first sub-color region set having hue values equal to or greater than a first predetermined value, among the first hue values assigned to the sub-color regions, and extracts a second sub-color region set having hue values equal to or greater than a second predetermined value, among the second hue values assigned to the sub-color regions, wherein the color histogram generator generates the first color histogram for the first sub-color region set and generates the second color histogram for the second sub-color region set, and wherein the first predetermined value is an average value of the first hue values and the second predetermined value is an average value of the second hue values.

7. The object-tracking apparatus of claim 6, further comprising:

an approximator that groups successively appearing sub-color regions among the sub-color regions to which the first hue values have been assigned and approximates the grouped sub-color regions based on a center value of the grouped sub-color regions, and groups successively appearing sub-color regions among the sub-color regions to which the second hue values have been assigned, and approximates the grouped sub-color regions based on a center value of the grouped sub-color regions, wherein the color histogram generator generates the color histograms using the sub-color regions respectively approximated for the first hue values and for the second hue values.

8. The object-tracking apparatus of claim 6, wherein the sub-color region definer continuously divides the color rendering values at regular intervals and then forms the plurality of sub-color regions.

9. The object-tracking apparatus of claim 6, further comprising an intensity and saturation condition comparator that determines that the object in the first image is different from the object in the second image when differences in saturation and intensity between the first image and the second image are greater than a third predetermined value or more and when both saturation and intensity of the second image are increased or decreased compared to the first image, even if it is determined by the color histogram comparator that the second color histogram is included in the extended area of the first color histogram.

10. The object-tracking apparatus of claim 6, further comprising an intensity and saturation condition comparator that determines that the object in the first image is different from the object in the second image when one of the object of the first image and the object of the second image has an intensity less than a predetermined lower limit and a remaining object has an intensity equal to or greater than a predetermined upper limit, even if it is determined by the color histogram comparator that the second color histogram is included in the extended area of the first color histogram.

* * * * *